(12) United States Patent
Jeong et al.

(10) Patent No.: US 8,213,287 B2
(45) Date of Patent: Jul. 3, 2012

(54) APPARATUS AND METHOD FOR RECORDING/REPRODUCING HOLOGRAPHIC DATA

(75) Inventors: Taek-seong Jeong, Suwon-si (KR); Jae-cheol Bae, Suwon-si (KR); Tae-kyung Kim, Seoul (KR); Sung-hee Hwang, Suwon-si (KR); Moon-Il Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 991 days.

(21) Appl. No.: 12/136,285

(22) Filed: Jun. 10, 2008

(65) Prior Publication Data

US 2009/0073852 A1 Mar. 19, 2009

(30) Foreign Application Priority Data

Sep. 17, 2007 (KR) .................. 10-2007-0094251

(51) Int. Cl.
*G11B 7/00* (2006.01)
(52) U.S. Cl. .................................................. 369/103
(58) Field of Classification Search .................. 369/103
See application file for complete search history.

(56) References Cited

U.S. PATENT DOCUMENTS

| | | | |
|---|---|---|---|
| 2005/0013231 A1* | 1/2005 | Kawano et al. ............... 369/103 |
| 2006/0164948 A1 | 7/2006 | Seko et al. | |
| 2007/0053274 A1* | 3/2007 | Yoo et al. ................. 369/112.16 |
| 2008/0070124 A1* | 3/2008 | Matsumoto et al. .............. 430/2 |
| 2008/0123506 A1* | 5/2008 | Morimoto ..................... 369/103 |
| 2009/0073851 A1* | 3/2009 | Jeong et al. .................... 369/103 |
| 2009/0323496 A1* | 12/2009 | Tanaka et al. ................. 369/100 |

FOREIGN PATENT DOCUMENTS

| | | |
|---|---|---|
| JP | 2007-149254 | 6/2007 |
| KR | 10-738978 | 7/2007 |
| KR | 2007-90578 | 9/2007 |

OTHER PUBLICATIONS

U.S. Appl. No. 12/186,738, filed Aug. 6, 2008, Taek-seong Jeong et al., Samsung Electronics Co., Ltd.
International Search Report and Written Opinion issued in corresponding International Patent Application No. PCT/KR2008/002831 dated Oct. 27, 2008.

* cited by examiner

*Primary Examiner* — Adam R Giesy
(74) *Attorney, Agent, or Firm* — NSIP Law

(57) ABSTRACT

An optical pickup of a holographic data recording/reproducing apparatus that emits light to a reflective holographic data storage medium in which a substrate, a reflection layer, a recording layer, and a cover layer are sequentially stacked, and receives the emitted light, the optical pickup including: a first light source unit to emit, during a recording operation, a signal beam having a first polarization and a reference beam having a second polarization perpendicular to the first polarization along the same optical path; and a main lens unit having a refractivity that varies according to a polarization of a passing light, so as to cause the signal beam to be reflected from the reflection layer then focused on a focal point, and to cause the reference beam to pass through the cover layer then be directly focused on the focal point.

40 Claims, 8 Drawing Sheets of the present invention provide an apparatus and method for recording/reproducing holographic data using a simplified optical system by matching the optical paths of a signal beam and a reference beam.

APPARATUS AND METHOD FOR RECORDING/REPRODUCING HOLOGRAPHIC DATA

CROSS-REFERENCE TO RELATED APPLICATION

This application claims the benefit of Korean Application No. 2007-94251, filed Sep. 17, 2007 in the Korean Intellectual Property Office, the disclosure of which is incorporated herein in its entirety by reference.

BACKGROUND OF THE INVENTION

1. Field of the Invention

Aspects of the present invention relate to an apparatus and method for recording and/or reproducing holographic data, and more particularly, to an apparatus and method for recording and/or reproducing holographic data using a single side input method in which an optical structure is simplified.

2. Description of the Related Art

Recently, information storage technology using holograms has become more widely used. A holographic data storage method using holograms stores data in the form of an optical interference pattern in a polymer material or an inorganic crystal that is sensitive to light. The optical interference pattern is formed by using two laser beams exhibiting an interference feature. That is, the interference pattern is formed when a reference beam and a signal beam having different paths interfere with each other. This interference causes a chemical or physical change to a photosensitive storage medium, thereby recording data. In order to reproduce the data from the recorded interference pattern, a reproduction beam similar to the reference beam used for recording is emitted onto the interference pattern recorded on the storage medium. The reflected reproduction beam is diffracted due to the interference pattern so that the signal beam is restored and the data is reproduced.

Holographic data storing technology includes a volume holographic method and a micro-holographic method. The volume holographic method records and/or reproduces data in units of pages using volume holography, while the micro-holographic method records and/or reproduces data in units of single bits by using micro-holography. The volume holographic method has an advantage in that a large amount of data can be processed at the same time. However, the volume holographic method is difficult to commercialize as an information storage device to general consumers because an optical system therefor needs to be precisely adjusted.

In the micro-holographic method, two condensed light beams are made to interfere with each other at a focal point. By moving this interference pattern on a plane of a storage medium, a plurality of patterns are recorded to form an information plane. By piling up the information planes in a depth direction of the storage medium, information is recorded in a 3-dimensional (3D) manner.

A conventional micro-hologram type recording and/or reproducing apparatus includes an optical system for the signal beam and an optical system for the reference beam in order to emit the signal beam and the reference beam to both sides of the storage medium. These two optical systems result in a complicated recording and/or reproducing apparatus. Furthermore, since the signal beam and the reference beam must be focused in an area having a diameter of about 1 μm or less in order to form the interference pattern, each optical system needs to be aligned with high precision.

SUMMARY OF THE INVENTION

In order to solve the above and/or other problems, aspects of the present invention provide an apparatus and method for recording/reproducing holographic data using a simplified optical system by matching the optical paths of a signal beam and a reference beam.

According to an aspect of the present invention, there is provided a holographic data recording and/or reproducing apparatus having an optical pickup that emits light to a reflective holographic data storage medium in which a substrate, a reflection layer, a recording layer, and a cover layer are sequentially stacked and that receives the reflected light from the reflective holographic data storage medium, wherein the optical pickup comprises: a first light source unit to emit, during a recording operation, a signal beam having a first polarization and a reference beam having a second polarization different from the first polarization along a same optical path; and a main lens unit to record data by using an interference pattern formed in a direction along a depth of the holographic data storage medium around a focal point on the recording layer, and having a refractivity that varies according to a polarization of a passing light, so as to cause the signal beam to be reflected from the reflection layer then be focused on the focal point and to cause the reference beam to pass through the cover layer of the holographic data storage medium then be directly focused on the focal point, wherein the signal beam and the reference beam have a same optical path in the main lens unit.

According to another aspect of the present invention, there is provided a method or recording and/or reproducing data to/from a reflective holographic data storage medium in which a substrate, a reflection layer, a recording layer, and a cover layer are sequentially stacked, the method including: emitting, during a recording operation, a signal beam having a first polarization and a reference beam having a second polarization different from the first polarization along a same optical path; causing, by a unit having a refractivity that varies according to a polarization of a passing light, the signal beam to be reflected from the reflection layer then focused on a focal point in the recording layer and the reference beam to pass through the cover layer then be directly focused on the focal point, wherein the data is recorded by an interference pattern formed in a direction along a depth of the holographic data storage medium around the focal point.

According to another aspect of the present invention, there is provided an optical pickup that emits light to a reflective data storage medium in which a substrate, a reflection layer, a recording layer, and a cover layer are sequentially stacked in order to record and/or reproduce data to/from the reflective data storage medium, the optical pickup comprising: a first light source unit to emit, during a recording operation, a signal beam having a first polarization and a reference beam having a second polarization different than the first polarization along a same optical path; and a main lens unit to record the data by using an interference pattern formed in a direction along a depth of the holographic data storage medium around a focal point on the recording layer, and having a refractivity that varies according to a polarization of a passing light, so as to cause the signal beam to be reflected from the reflection layer then be focused on the focal point and to cause the reference beam to pass through the cover layer of the holographic data storage medium then be directly focused on the focal point, wherein the signal beam and the reference beam have a same optical path in the main lens unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
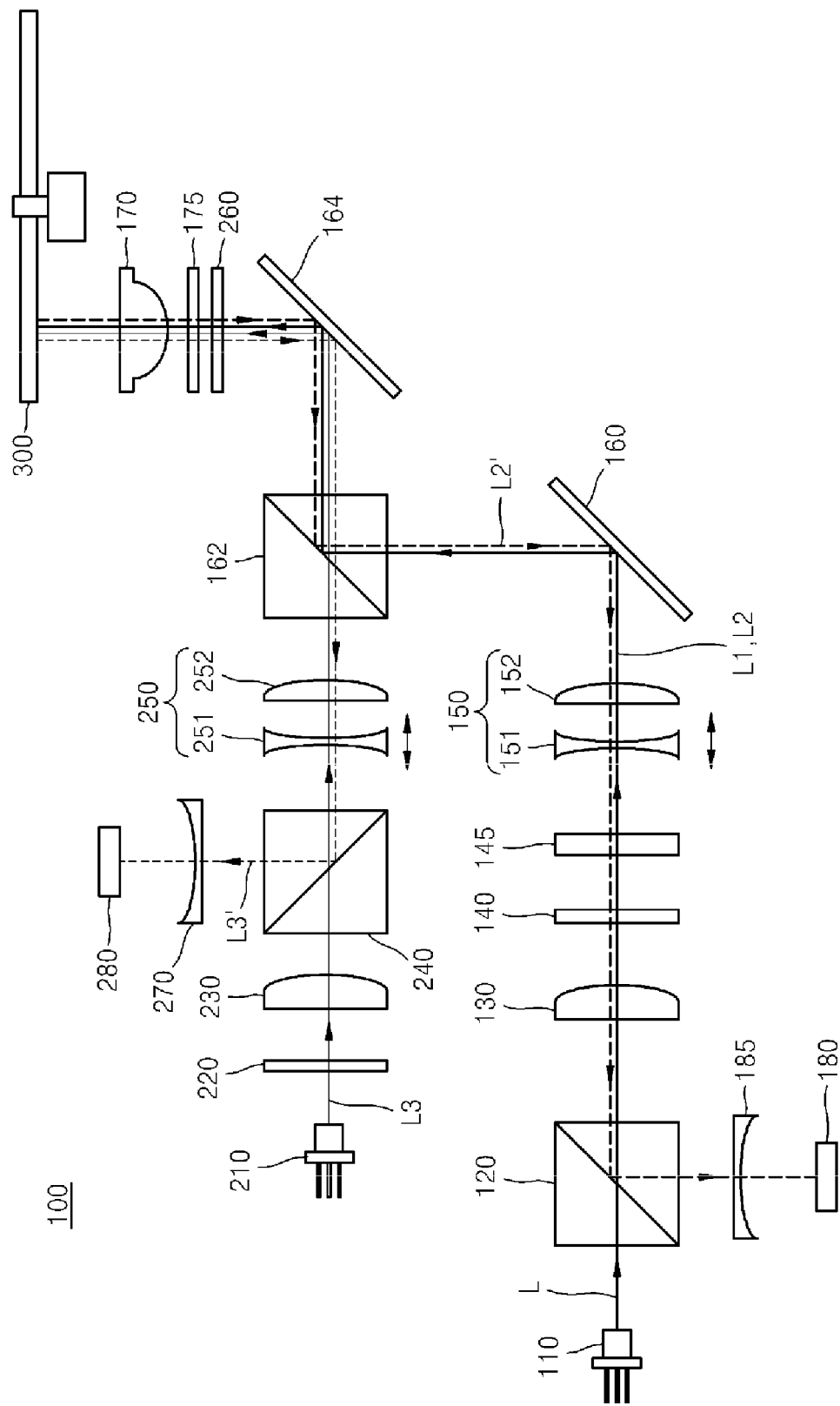
FIG. 1 illustrates an optical configuration of an apparatus for recording and/or reproducing holographic data according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
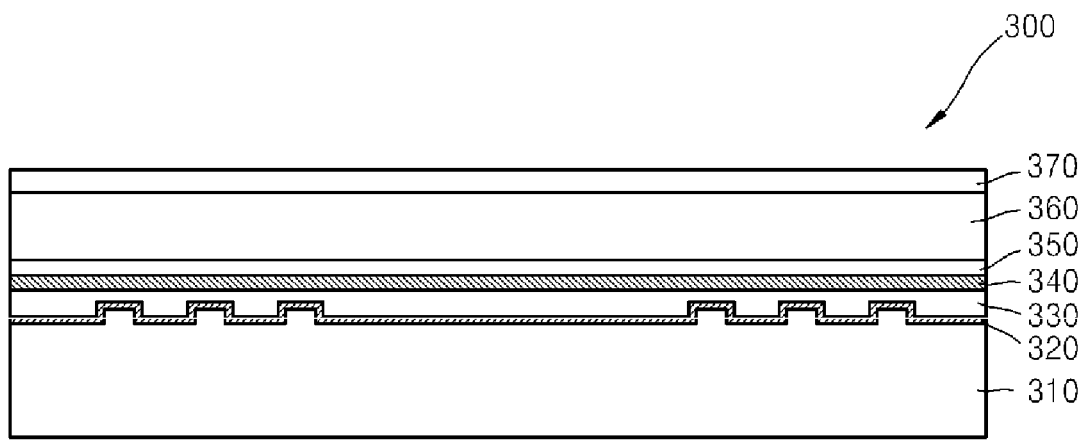
FIG. 2 illustrates an example of a reflection type holographic data storage medium used in the holographic data recording and/or reproducing apparatus according to an embodiment of the present invention.

FIG. 1 illustrates an optical configuration of an apparatus for recording and/or reproducing holographic data according to an embodiment of the present invention. FIG. 2 illustrates an example of a reflection type holographic data storage medium adopted in the holographic data recording and/or reproducing apparatus according to an embodiment of the present invention.

Referring to FIG. 1, the holographic data recording and/or reproducing apparatus records data on a holographic data storage medium and/or reproduces recorded data therefrom. The holographic recording and/or reproducing apparatus includes a circuit portion (not shown) and an optical pickup 100 to emit a light to a single side of a holographic data storage medium 300 and to receive the reflected light. The optical pickup 100 includes a first light source 110, a first optical path change device 120, a first collimating lens 130, a polarization conversion device 140, a polarization dependent refractive lens 145, a first relay lens unit 150, a first mirror 160, a second optical path change device 162, a second mirror 164, a quarter wave plate 175, an objective lens 170, and a photodetector 180. Also, to read servo data, the optical pickup 100 further includes a servo optical system including a second light source 210, a diffraction grating 220, a second collimating lens 230, a third optical path change device 240, a second relay lens unit 250, a correction device 260, a detection lens 270, and a second photodetector 280.

The first light source 110 and the polarization conversion device 140 form a first light source unit that emits a signal beam L1 and a reference beam L2 in a recording mode, and emits a reproduction beam L2' in a reproduction mode. Specifically, the first light source 110 emits a recording and/or reproducing light L having a linear polarization in one direction. The first light source 110 may employ, for example, a semiconductor laser diode emitting blue light. Furthermore, the first light source 110 may emit a P-polarized light L that is modulated according to data to be recorded in the recording mode, and a P-polarized light L that is not modulated in the reproduction mode.

The polarization conversion device 140 employs an active wave plate (for example, an active half wave plate or an active quarter wave plate). In a recording mode, the polarization conversion device 140 functions as a wave plate and converts the polarization of a light emitted from the first light source 110 to a light having polarization components of, for example, P polarization and S polarization. Conversely, in the reproduction mode, the polarization conversion device 140 transmits the light emitted from the first light source 110 as is, without functioning as a wave plate. A liquid crystal device using a birefringent characteristic of liquid crystal, which is arranged to have an optical axis when a voltage is applied, may be employed as the active wave plate. For example, when a voltage is applied to the active half wave plate, if an angle between the direction of a predetermined linear polarization of an incident light and the optical axis of the active half wave plate (in particular, a fast axis) is not 45°, the incident light (for example, a P-polarized light) has its polarization direction changed while passing through the active half wave plate. Accordingly, the light is changed to a light having two linear polarization components perpendicular to each other (i.e., a light having an S polarization component and a P polarization component). The S polarization component and the P polarization component, with the changed polarization directions, correspond respectively to a signal beam L1 and a reference beam L2. The signal beam L1 and the reference beam L2, having two perpendicular polarization components, pass through a main lens unit sequentially arranged along the same optical path. For the active quarter wave plate, when a voltage is applied, the incident light having a linear polarization is changed to a circular polarization light. Since the circular polarization light has two perpendicular linear polarization components, the polarization components can be used as the signal beam L1 and the reference beam L2. Furthermore, since the active half wave plate and the active quarter wave plate are well known in the technical field to which aspects of the present invention pertain, a detailed description thereof will be omitted herein.

The first optical path change device 120 may be, for example, a polarized beam splitter that is a polarization selective light change device. Since the polarization direction of a reproduction beam L2' emitted to the holographic data storage medium 300 and the polarization direction of the reproduction beam L2' reflected from the holographic data storage medium 300 (to be described later) are perpendicular to each other, the first optical path change device 120 can split the reproduction beam L2' reflected from the holographic data storage medium 300 from an optical path of the reproduction beam L2' emitted from the first light source 110 to a holographic data storage medium 300. Although in the shown embodiment the first optical path change device 120 is arranged between the first light source 110 and the first collimating lens 130, aspects of the present invention are not limited thereto. For example, according to other aspects, the first collimating lens 130 is provided between the first light source 110 and the first optical path change device 120.

The first collimating lens 130 converts the recording/reproducing light L emitted from the first light source 110 to a parallel beam. Although in the shown embodiment the first collimating lens 130 is provided between the first optical path change device 120 and the polarization conversion device 140, aspects of the present invention are not limited thereto. For example, according to other aspects, the first collimating lens 130 is provided between the first light source 110 and the first optical path change device 120.

The polarization dependent refractive lens 145, the first relay lens unit 150, the quarter wave plate 175, and the objective lens unit 170 form the main lens unit that focuses the signal beam L1 and the reference beam L2 onto the holographic data storage medium 300.

The polarization dependent refractive lens 145 may be a liquid crystal lens having a refractivity that varies according to a direction of polarization. The liquid crystal lens uses the birefringent characteristic of liquid crystal. When a voltage is applied to liquid crystal, the liquid crystal has a different refractivity to a P-polarized light as compared to an S-polarized light according to the orientation of liquid crystal molecules. However, it is understood that aspects of the present invention are not limited thereto. For example, the polarization dependent refractive lens 145 may also be a polarization hologram device having a refractivity that varies according to a direction of polarization. Similarly, the polarization hologram device also has a different refractivity according to the polarization direction of the incident light. A stepped or blazed hologram pattern of the polarization hologram device causes a light having one polarization component to be refracted and a light having another polarization component to pass therethrough.

For example, the polarization dependent refractive lens 145 refracts the S-polarized signal beam L1 and transmits the P-polarized reference beam L2 or reproduction beam L2' without refraction. Since the liquid crystal lens and the polarization hologram device are well known to those of ordinary skill in the technical field to which aspects of the present invention pertain, a detailed description thereon will be omitted herein.

Also, although in the shown embodiment the polarization dependent refractive lens 145 is arranged between the polarization conversion device 140 and the first relay lens unit 150, aspects of the present invention are not limited thereto. For example, according to other aspects, the polarization dependent refractive lens 145 can be arranged between the first mirror 164 and the objective lens 170 or can be installed in a single lens holder (not shown) with the objective lens 170 and the quarter wave plate 175.

The first relay lens unit 150 includes a plurality of lenses 151 and 152 to vary the focal point of the signal beam L1, the reference beam L2, or the reproduction beam L2' on the holographic data storage medium 300 in a direction along the depth of the holographic data storage medium 300. A driving portion (not shown) is capable of moving at least one lens 151 of the first relay lens unit 150 along the optical axis direction. The first relay lens unit 150 varies the focal point in the depth direction of the holographic data storage medium 300 so that an information plane where data is written can be formed in multiple layers.

The first and second mirrors 160 and 164 appropriately change the optical path of the signal beam L1 and the reference beam L2 so that optical elements in the optical pickup 100 can be appropriately arranged. The second optical path change device 162 combines an optical path of a servo light L3 with an optical path of the signal beam L1 and the reference beam L2 or the optical path of the reproduction beam L2'. The second optical path change device 162 may be, for example, a wavelength selective beam splitter.

The quarter wave plate 175 changes the polarization direction of the reflected light and the polarization direction of the light incident on the holographic data storage medium 300. Accordingly, as described below, the reflection light of the reproduction beam L2' is split by the first optical path change device 120 away from the path of the light L emitted from the first light source 110 in order to be detected by the first photodetector 180.

The objective lens 170 focuses the signal beam L1 and the reference beam L2 or the reproduction beam L2' onto a predetermined area of the holographic data storage medium 300. Since, as described above, the signal beam L1 and the reference beam L2 have different polarizations and the polarization dependent refractive lens 145 has a refractive power that varies according to the polarization direction, the focal lengths of the signal beam L1 and the reference beam L2 in the objective lens 170 vary. For example, as the signal beam L1 is refracted and the reference beam L2 is not refracted when passing through the polarization dependent refractive lens 145, the focal lengths of the signal beam L1 and the reference beam L2 passing through the objective lens 170 may vary. By making the focal length of the reference beam L2 shorter than that of the signal beam L1, the refractive power of each optical element of the main lens unit is designed so that the reference beam L2 is directly focused on a focal point F on a recording layer 360 (illustrated in FIG. 3) while the signal beam L1 is reflected by a reflection layer 340 and focused on the focal point F on the recording layer 360. The optical design can be changed according to the detailed positional relationship between the optical elements and the detailed specification of the holographic data storage medium 300.

The main lens unit guides the signal beam L1 and the reference beam L2 along the same optical path in the recording mode and varies the focal lengths formed on the objective lens 170 by applying a different refractivity according to the direction of polarization. That is, the main lens unit makes the focal length of the signal beam L1 longer than the focal length of the reference beam L2 in the recording mode so that the signal beam L1 is focused after being reflected by the reflection layer 340 while the reference beam L2 is directly focused on the recording layer 360.

The first photodetector 180 detects the reproduction beam L2' that is reflected from the holographic data storage medium 300 and split by the first optical path change device 120. A concentration lens 185 for concentrating the reproduction beam L2' is further provided between the first optical path change device 120 and the first photodetector 180.

In the shown servo optical system, the holographic data storage medium 300 used in the holographic data recording and/or reproducing apparatus according to aspects of the present invention includes a servo layer 320 (illustrated in FIG. 2). That is, the optical pickup 100 further includes the servo optical system to read servo information recorded on the servo layer 320.

The second light source 210 emits the servo light L3. The second light source 210 may be, for example, a semiconductor laser diode emitting a red beam. The second light source 210 may emit a light L having a linear polarization in one direction. Accordingly, the third optical path change device 240 can split the servo light L3' reflected from the holographic data storage medium 300 and the servo light L3 incident on the holographic data storage medium 300 according to the polarization direction. The diffraction grating 220 is an optical element for diffracting the servo light L3 emitted from the second light source 210 into the $0^{th}$ order diffractive light and $\pm 1^{st}$ order diffractive light. Furthermore, the diffraction grating 220 can detect a servo error signal using a push-pull method. The second collimating lens 230 corrects the servo light L3 emitted from the second light source 210 to a parallel beam. The third optical path change device 240 may be, for example, a polarized beam splitter, and splits the servo light L3 incident on the holographic data storage medium 300 and the servo light L3' reflected from the holographic data storage medium 300 according to the polarization direction, as described above. The second relay lens unit 250 varies the focal point of the servo light L3 on the holographic data storage medium 300 in a direction along the depth of the holographic data storage medium 300 and includes a plurality of lenses 251 and 252. A driving portion (not shown) is capable of moving at least one lens 251 of the second relay lens unit 250 in a direction along the optical axis. The correction device 260 removes an aberration generated in the servo light L3 when the objective lens 170 is designed according to the wavelength of the light for recording and/or reproducing. Specifically, an aberration may be generated in the objective lens 170 due to a difference between the wavelength of the servo light L3 and the wavelength of the light L for recording and/or reproducing. The detection lens 270 causes the light spot of the servo light L3' reflected from the second photodetector 280 to be formed appropriately. The detection lens 270 may be, for example, an astigmatism lens such that a focus error signal can be detected using an astigmatism method. The second photodetector 280 includes a plurality of photodetection portions and detects servo information and a servo error signal contained in the servo layer 320 of the holographic data storage medium 300 (illustrated in FIG. 2). The above-described servo optical system is an exemplary optical system for a case of using a servo light of a wavelength that is different from the wavelength of the light for recording and/or reproducing. However, it is understood that aspects of the present invention are not limited thereto.

An example of the holographic data storage medium 300 used for a holographic data recording and/or reproducing apparatus according to aspects of the present invention is a reflection type storage medium. An example of such a holographic data storage medium is disclosed in Korean Patent Application No. 10-2007-0081445 filed by the present applicant, the disclosure of which is incorporated by reference. FIG. 2 shows the holographic data storage medium 300. Referring to FIG. 2, the holographic data storage medium 300 includes a structure in which a substrate 310, the servo layer 320, a buffer layer 330, a reflection layer 340, a space layer 350, the recording layer 360, and a cover layer 370 are sequentially provided. The servo layer 320 on which servo information is recorded reflects the servo light L3 of FIG. 1. The buffer layer 330 may be formed of a parent material or a material that absorbs the wavelength of the light for recording and/or reproduction. The reflection layer 340 reflects the signal beam L1 to be focused on a focal point F (illustrated in FIG. 3) on the recording layer 350. Furthermore, the reflection layer 340 is provided to transmit the servo light L3 and the reference beam L2. The space layer 350 is a layer for obtaining a space between the recording layer 360 and the reflection layer 340. The recording layer 360 is formed of a light reactive material of which refractivity varies when absorbing light. For example, the recording layer 360 may be formed of a photo polymer or a thermoplastic material. The cover layer 370 is a layer for protecting the recording layer 360 from the outside.

Figure 3:
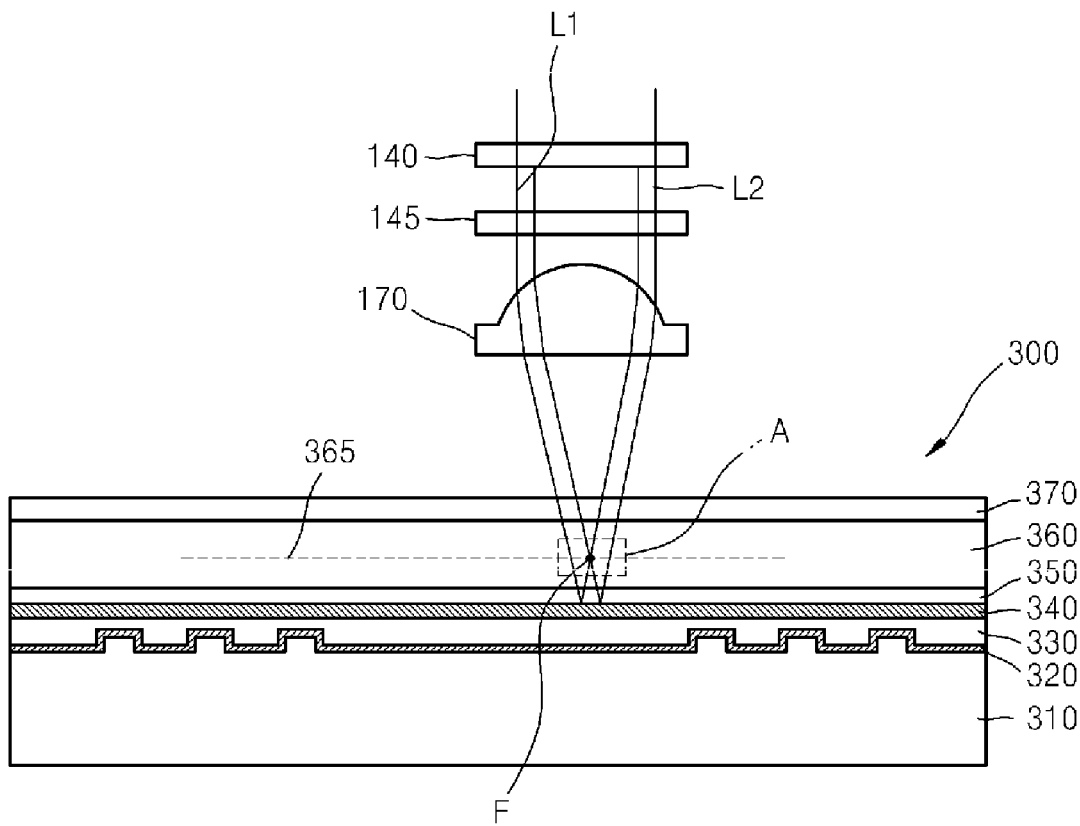
FIG. 3 illustrates an optical configuration for emitting a signal beam and a reference beam onto the holographic data storage medium of FIG. 2.
Figure 4:
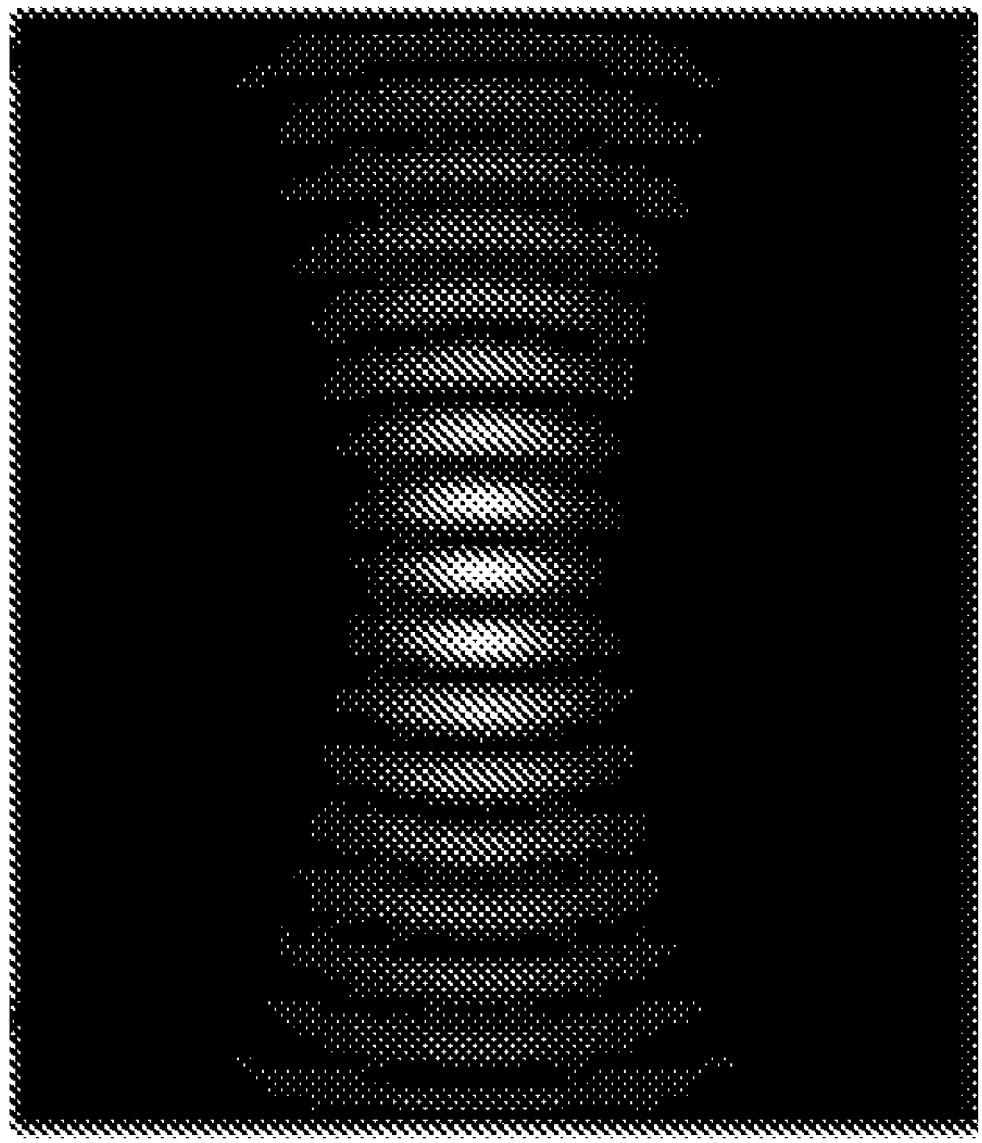
FIG. 4 is an enlarged image of a portion A of FIG. 2 showing the interference pattern formed in the holographic data storage medium by the signal beam and the reference beam.

A recording and/or reproducing method of a holographic data recording and/or reproducing apparatus according to aspects of the present invention will now be described with reference to FIGS. 3 to 7. First, a recording mode of the holographic data recording/reproducing apparatus will be described. FIG. 3 illustrates an optical configuration for emitting a signal beam and a reference beam onto the holographic data storage medium 300 of FIG. 2. FIG. 4 is an enlarged image of a portion A of FIG. 3.

Referring to FIG. 3, the signal beam L1 and the reference beam L2 respectively having an S polarization component and a P polarization component that are perpendicular to each other are generated on the same optical path. For example, assuming that the light L emitted from the first light source 110 of FIG. 1 has a linear polarization in one direction, the polarization conversion device 140 changes the emitted light to a light having a P polarization component and an S polarization component.

The signal beam L1 and the reference beam L2 are guided through the same optical path differ in the amount of refraction according to the respective polarization direction. Thus, the signal beam L1 passes through the cover layer 370 and the recording layer 360 of the holographic data storage medium 300 before the reflection layer 340 reflects the signal beam L1 to be focused on the focal point F in the recording layer 360. In contrast, the reference beam L2 passes through the cover layer 370 and is focused on the focal point F in the recording layer 360. For example, the objective lens 170 directs the reference beam L2 to pass through the cover layer 370 and to directly focus on the focal point F. The polarization dependent refractive lens 145 refracts the signal beam L1 so that the signal beam L1 is reflected from the reflection layer 340 and focused on the focal point F in the recording layer 360. The polarization dependent refractive lens 145 can be designed to refract only the signal beam L1 of an S polarization and not refract the reference beam L2 of a P polarization. An interference pattern forms as the light spots of the signal beam L1 and the reference beam L2 are overlapped at the focal point F. Since the shape of the interference pattern varies according to the modulated state of the signal beam L1 or the modulated state of the signal beam L1 and the reference beam L2, information can be recorded based on the interference pattern.

FIG. 4 is an enlarged image of a portion A around the focal point F of the signal beam L1 and the reference beam L2 of FIG. 3. Specifically, FIG. 4, illustrates the interference pattern formed around the focal point F. The interference pattern is recorded along a track on a same plane, resulting in an information plane 365 of a single layer on the recording layer 360. As the focal point F varies in a direction along the depth of the holographic recording layer 360, the interference patterns are overlapped so that recording can be done in multiple layers. The holographic data storage medium 300 of the present embodiment uses a micro holography method in which a single bit of information at each focal point F is contained in the interference pattern. However, it is understood that aspects of the present invention are not limited thereto. For example, a volume holography method may be employed in which an interference pattern is formed in three dimensions as the spots of the signal beam L1 and the reference beam L2 are overlapped at the focal point F so that a large amount of information is simultaneously recorded.

Figure 5:
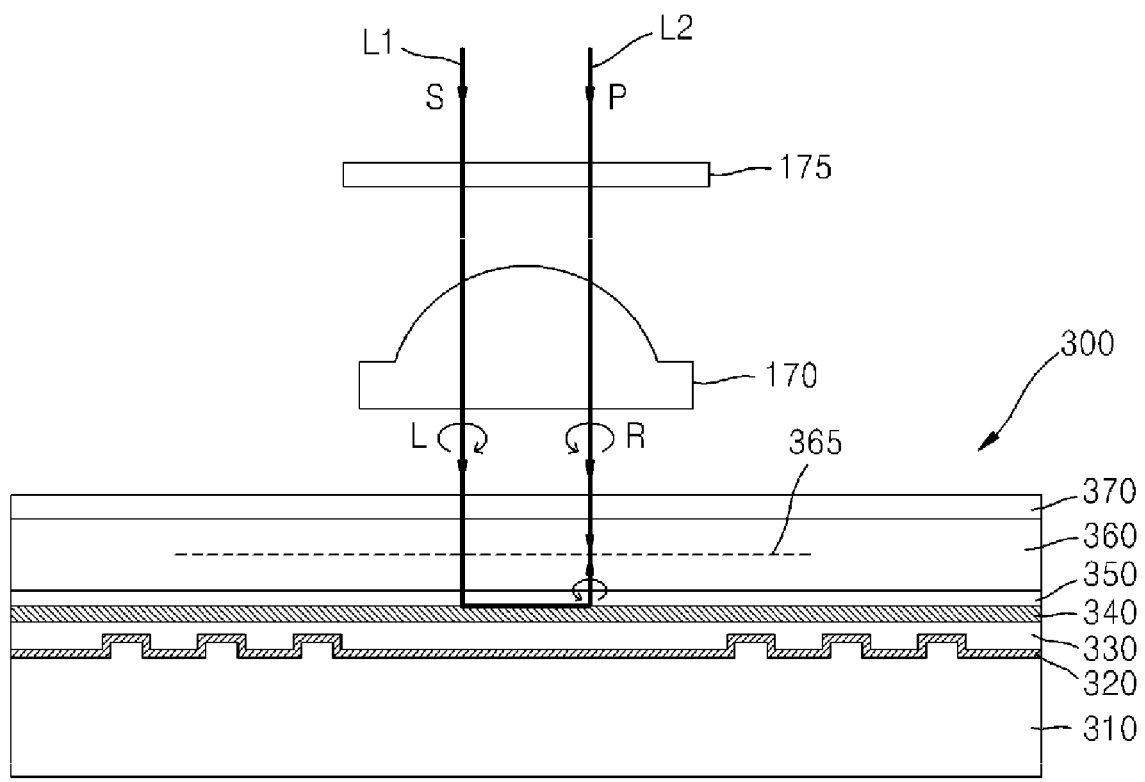
FIG. 5 illustrates a polarization state of the signal beam and the reference beam incident on the holographic data storage medium of FIG. 2 in a recording mode.

FIG. 5 illustrates a polarization state of the signal beam L1 and the reference beam L2 incident on the holographic data storage medium 300 of FIG. 2 in a recording mode. Referring to FIG. 5, the signal beam L1 and the reference beam L2 having different linear polarizations are incident on the quarter wave plate 175. For example, the signal beam L1 is incident on the quarter wave plate 175 in a state of an S polarization while the signal beam L2 is incident on the quarter wave plate 175 in a state of a P polarization. The quarter wave plate 175 is an optical element for changing a linear polarization of a light beam to a circular polarization and vice versa. As the signal beam L1 passes through the quarter wave plate 175, the quarter wave plate 175 changes the polarization state of the signal beam L1 to a left circular polarization L. As the reference beam L2 passes through the quarter wave plate 175, the quarter wave plate 175 changes the polarization state of the reference beam L2 to a right circular polarization R. The reflection layer 340 reflects the signal beam L1 having the left circular polarization L, such that the signal beam L1 maintains the left circular polarization L and is focused on the information plane 365. In contrast, the reference beam L2 of the right circular polarization R passes through the cover layer 370 and is directly focused on the information plane 365. As the signal beam L1 and the reference beam L2 intersecting on the information plane 365 proceed while facing each other with opposite circular polarizations, the electric field vector of the signal beam L1 and the electric field vector of the reference beam L2 are rotated in the same direction. Thus, interference is generated on the information plane 365. As described above, the interference causes the recording of data in the holographic recording layer 360 formed of a photosensitive material.

Figure 6:
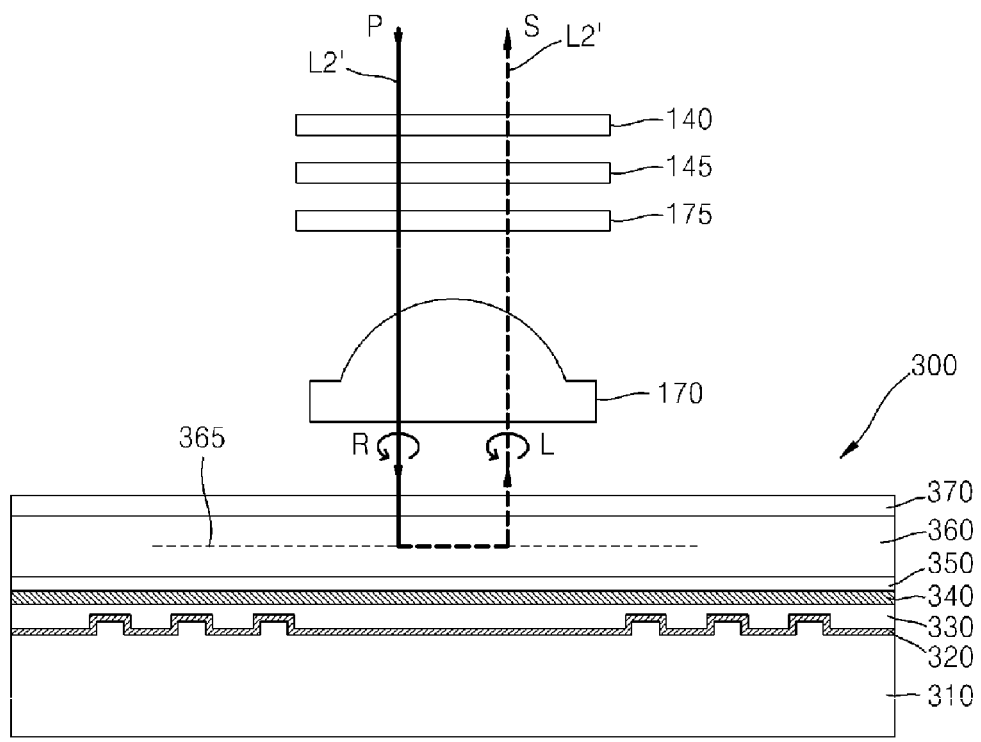
FIG. 6 illustrates a polarization state of the reproduction beam incident on the holographic data storage medium of FIG. 2 in a reproduction mode.

FIG. 6 illustrates a polarization state of the reproduction beam L2' incident on the holographic data storage medium 300 of FIG. 2 in a reproduction mode. Referring to FIG. 6, in the recording mode of the holographic data recording and/or reproducing apparatus according to an embodiment of the present invention, a reproduction beam L2' having the same polarization direction as that of the reference beam L2 for reproduction is emitted to the holographic data storage medium 300. Since the polarization conversion device 140 of FIG. 1 does not perform a polarization conversion function, the reproduction beam L2' has the same polarization direction as that of the reference beam L2 (for example, a P polarization), and is guided toward the holographic data storage medium 300. Since the polarization dependent refractive lens 145 applies refractivity only in the polarization direction of the signal beam L1 (for example, an S polarization), the polarization dependent refractive lens 145 does not refract the reproduction beam L2' as the reproduction beam L2' proceeds towards the objective lens 170 so as to be focused on the information plane 365 of the recording layer 360.

The reproduction beam L2' of, for example, the P polarization passes through the quarter wave plate 175, which causes the reproduction beam L2' to have the right circular polarization R. Then, the objective lens guides the reproduction beam L2' to be incident on the holographic data storage medium 300. The reproduction beam L2' incident in the right circular polarization R state is diffracted (i.e., reflected) by the interference pattern on the information plane 365 and proceeds to the objective lens 170. Since only the direction of the light of the reproduction beam L2' reflected from the information plane 365 changes, and not the rotational direction of the electric field vector, the reproduction beam L2' has the left circular polarization L. The quarter wave plate 175 changes the polarization direction (for example, to be an S polarization) of the reflected reproduction beam L2' having the left circular polarization L before the reproduction beam L2' reversely proceeds along the optical path of the incident reproduction beam L2'. As described above, the first optical path change unit 120 reflects the reflected reproduction beam L2' and the first photodetector 180 detects the reproduction beam L2'.

Figure 7:
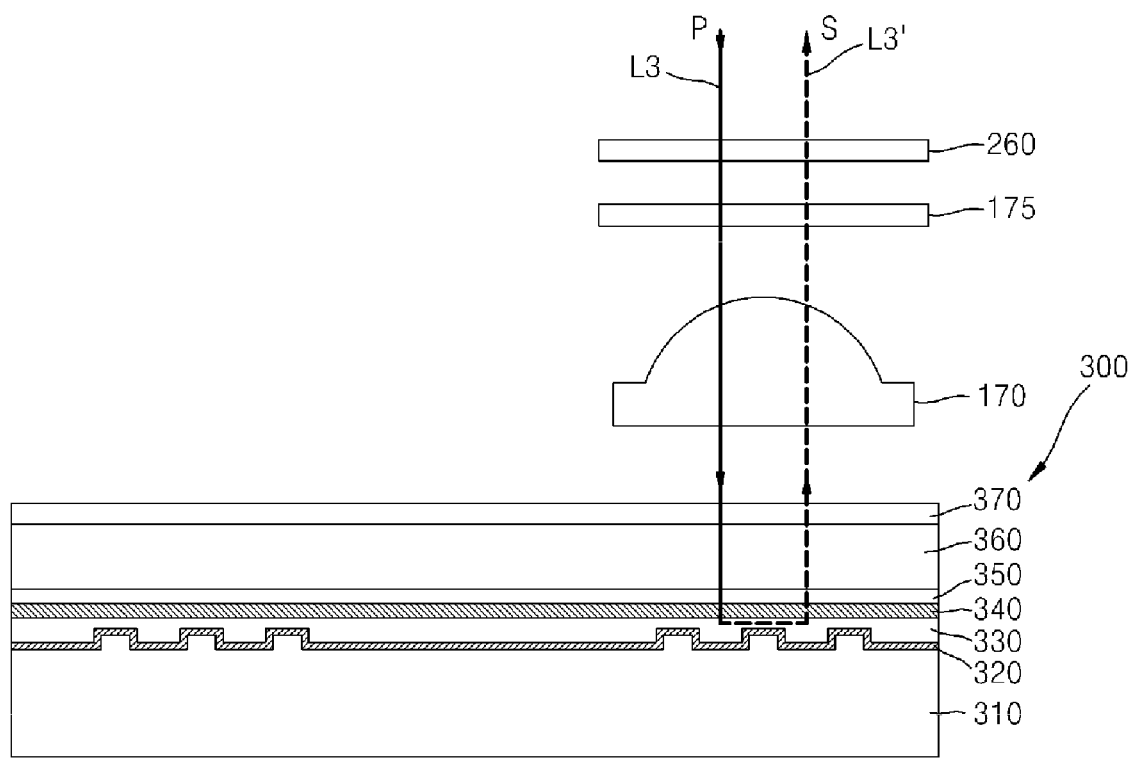
FIG. 7 illustrates a servo light incident on the holographic data storage medium of FIG. 2 in a servo process.

FIG. 7 illustrates a servo light L3 incident on the holographic data storage medium 300 of FIG. 2 in a servo process. Referring to FIG. 7, a servo light L3 of a linear polarization in one direction (for example, a P polarization) passes through the correction device 260, the quarter wave plate 175, and the objective lens 170 and is incident on the holographic data storage medium 300. The correction device 260 corrects the servo light L3 in preparation for an aberration that may be generated in the objective lens 170. The quarter wave plate 175 changes, for example, the P polarization of the servo light L3 to a left circular polarization. The servo layer 320 reflects the servo light L3 incident on the holographic data storage medium 300. At this time, the rotational direction of a polarization vector of the servo light L3 is not changed, but the proceeding direction of the light is reversed so that the left circular polarization is changed to the right circular polarization. As the reflected servo light L3' passes through the quarter wave plate 175, the quarter wave plate 175 changes the polarization of the servo light L3' (for example, to be the S polarization) before the servo light L3' proceeds in the reverse direction along the optical path of the incident servo light L3. As described above, the third optical path change device 240 reflects the servo light L3' and the second photodetector 280 detects the servo light L3'.

Figure 8:
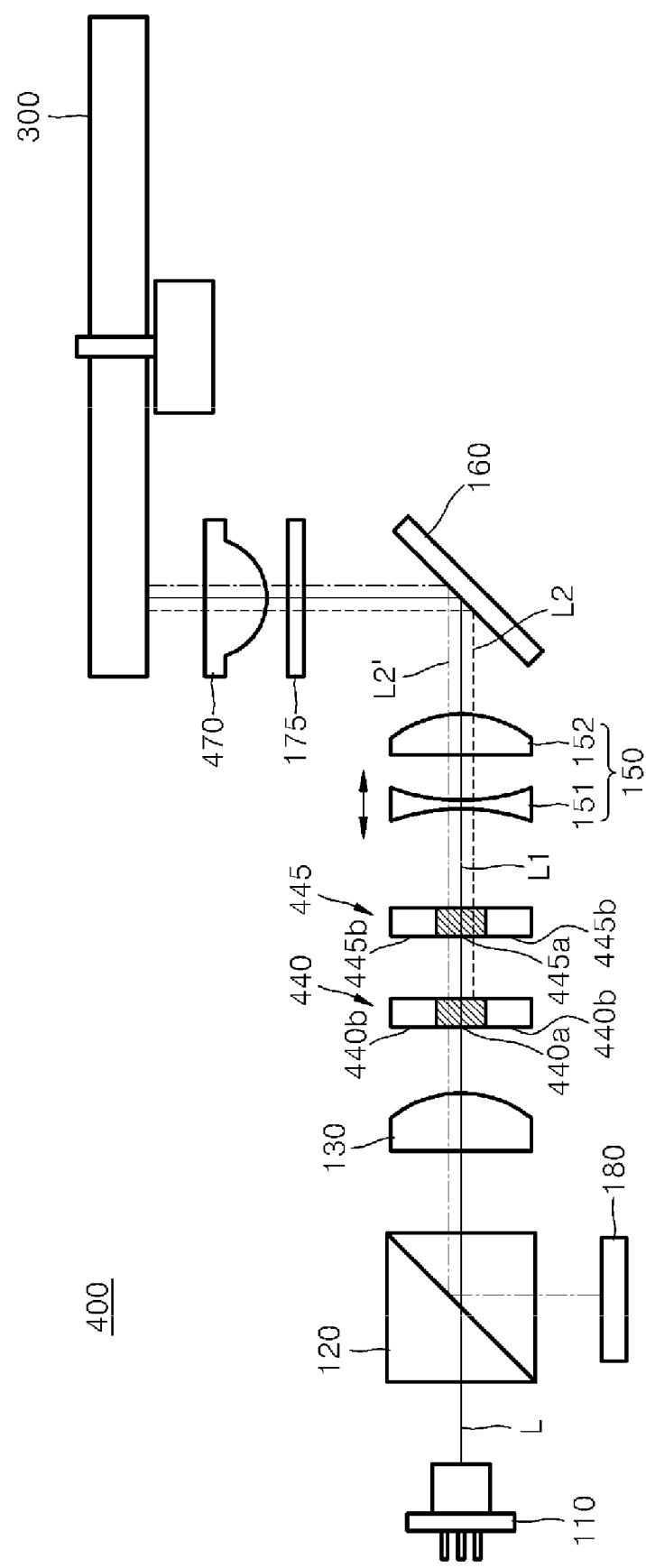
FIG. 8 illustrates an optical configuration of an apparatus for recording and/or reproducing holographic data according to another embodiment of the present invention.
Figure 9:
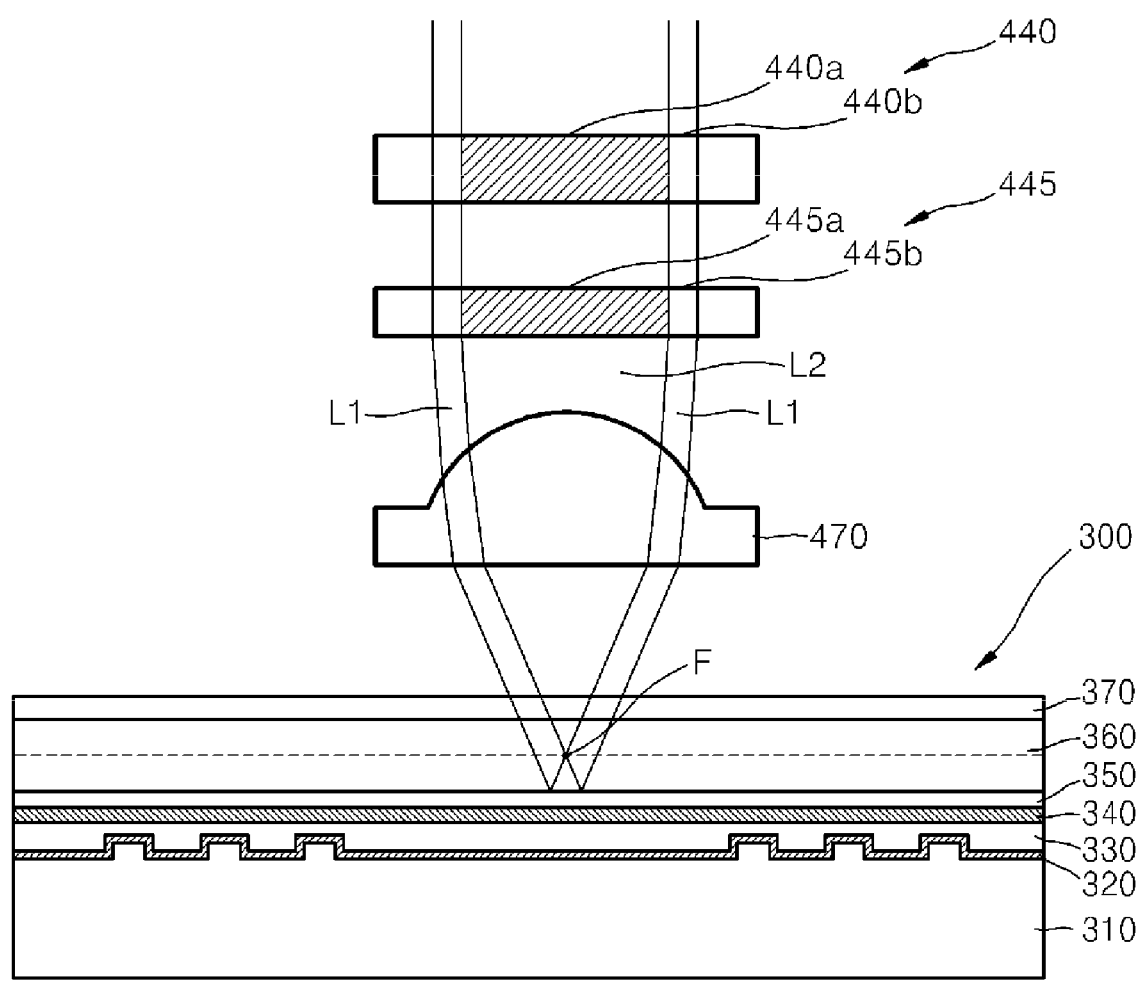
FIG. 9 illustrates an optical configuration of emitting the signal beam and the reference beam onto the holographic data storage medium in the holographic data recording and/or reproducing apparatus of FIG. 8.

FIG. 8 illustrates an optical configuration of an apparatus for recording and/or reproducing holographic data according to another embodiment of the present invention. FIG. 9 illustrates an optical configuration for emitting a signal beam and a reference beam onto a holographic data storage medium 300 in the holographic data recording and/or reproducing apparatus of FIG. 8.

Referring to FIGS. 8 and 9, a holographic data recording and/or reproducing apparatus records data on the holographic data storage medium 300 and/or reproduces the recorded data. The holographic data recording and/or reproducing apparatus includes a circuit portion (not shown), an optical pickup 400 to emit light L onto a single surface of the holographic data storage medium 300 and to receive the emitted light. The optical pickup 400 includes a first light source 110, a first optical path change device 120, a first collimating lens 130, a polarization conversion device 440, a polarization dependent refractive lens 445, a first relay lens unit 150, a first mirror 160, a second optical path change device 162, a second mirror 164, a quarter wave plate 175, an objective lens 470, and a photodetector 180. Although not illustrated, the optical pickup 400 may further include a servo optical system as in the previously described embodiment. Of the optical elements in the embodiment shown in FIGS. 8 and 9, the optical elements that are substantially the same as those of the holographic data recording and/or reproducing apparatus of FIG. 1 have the same reference numerals and detailed descriptions thereof will be omitted here.

The first light source 110 and the polarization conversion device 440 form a first light source portion that emits the signal beam L1 and the reference beam L2 in a recording mode and the reproduction beam L2' in a reproduction mode.

Specifically, the first light source 110 emits a light L of a P polarization modulated according to data to be recorded in the recording mode, and emits a light L of a P polarization that is not modulated in the reproduction mode. The polarization dependent refractive lens 445, the first relay lens unit 150, the quarter wave plate 175, and the objective lens 470 form a main lens unit that focuses the signal beam L1 and the reference beam L2 onto the holographic data storage medium 300.

The polarization conversion device 440 converts the polarization of an incident light in different ways, according to an area of the polarization conversion device 440. For example, a light exit surface of the polarization conversion device 440 includes a non-conversion area 440a in which the light of a P polarization emitted from the first light source 110 is transmitted without polarization conversion regardless of the operating mode. Furthermore, the light exit surface also includes one or more polarization conversion areas 440b in which the light of a P polarization emitted from the first light source 110 is changed to a light of an S polarization in the recording mode, and the light of a P polarization emitted from the first light source 110 is transmitted without polarization conversion in the reproduction mode. While in the present embodiment, the non-conversion area 440a takes the central area of the light exit surface and the polarization conversion area 440b takes a peripheral area encompassing the central area, it is understood that aspects of the present invention are not limited thereto. That is, the polarization conversion area 440b may take the central area of the light exit surface of the polarization conversion device 440 and the non-conversion area 440a may take the peripheral area thereof according to other aspects.

In the polarization conversion device 440, the non-conversion area 440a is formed of a transparent member or is a hole, and the polarization conversion area 440b is formed of, for example, an active half wave plate. The active half wave plate of the polarization conversion area 440b has an optical axis (for example, a fast axis) arranged at an angle of approximately 45° in a polarization direction of the P polarization that is incident so that the P-polarized light is changed to the S-polarized light in the recording mode. Since the non-conversion area 440a transmits the P-polarized light regardless of the operating mode, the P-polarized light passing through the non-conversion area 440a corresponds to the reference beam L2 in the recording mode. Thus, the S-polarized light whose polarization has been changed in the polarization conversion area 440b in the peripheral area corresponds to the signal beam L1. The signal beam L1 and the reference beam L2 pass through the main lens unit along the same optical path by being divided into an inner circumferential light flux and an outer circumferential light flux.

The polarization dependent refractive lens 445 is arranged at the light exit surface of the polarization conversion device 440 to change a refractivity according to the polarization direction of the light. For example, the polarization dependent refractive lens 445 transmits the P-polarized light as is or refracts the S-polarized light. The polarization dependent refractive lens 445 may be a liquid crystal lens or a polarization hologram device. For example, since a P-polarized reference beam L2 is incident on a first refractive lens area 445a of the polarization dependent refractive lens 445 corresponding to the non-conversion area 440a of the polarization conversion device 440 in the recording mode, the reference beam L2 incident on the first refractive lens area 445a is transmitted without refraction. In contrast, since an S-polarized signal beam is incident on a second refractive lens area 445b of the polarization dependent refractive lens 445 corresponding to the polarization conversion area 440b of the polarization conversion device 440, the signal beam L1 incident on the second refractive lens area 445b is refracted.

Furthermore, since the amount of refraction varies as the signal beam L1 and the reference beam L2 identically pass through the polarization dependent refractive lens 445, the focal length of the signal beam L1 and the focal length of the reference beam L2 passing through the objective lens 470 can be changed. That is, by adjusting the refractivity of the polarization dependent refractive lens 445 such that the focal length of the reference beam L2 is shorter than that of the signal beam L1 in the objective lens 445, the reference beam L2 can be directly focused on the focal point F of the recording layer 360. The refractivity of each optical element of the main lens unit is designed so that the signal beam L1 is reflected from the reflection layer 340 and then focused on the focal point F of the recording layer 360. The optical design varies according to a specific specification of the holographic data storage medium 300 and a specific positional relationship between the optical devices.

In the holographic data recording/reproducing apparatus and method according to aspects of the present invention, a signal beam and a reference beam can be emitted to a holographic data storage medium along a same optical path by matching the signal beam and the reference beam to first and second polarization components that are perpendicular to each other and varying refractivity according to a polarization direction of each beam. Moreover, while in the above-described embodiments, the signal beam L1 has an S polarization and the reference beam L2 and the reproduction beam L2' have a P polarization, it is understood that aspects of the present invention are not limited thereto. For example, according to other aspects, the reference beam L2 and reproduction beam L2' can have the S polarization while the signal beam L1 has the P polarization. Furthermore, the signal beam L1 and the reference beam L2 have circular polarizations that are perpendicular to each other.

In the above-described embodiments, the polarization conversion device 140 and 440 is described as an active wave plate (such as an active half wave plate or an active quarter wave plate). However, it is understood that the active wave plate is an example of the polarization conversion device 140 and 440 performing a function to turn on/off a polarization conversion according to a switch between the recording mode and the reproduction mode, and aspects of the present invention are not limited thereto. For example, a movable wave plate that is arranged on the optical path in the recording mode and removed from the optical path in the reproduction mode by a mechanical driving portion that is separately provided can also be employed as the polarization conversion device 140 and 440.

Also, in the above-described embodiments, the holographic data recording/reproducing apparatus is described as performing both recording and reproduction. However, aspects of the present invention can be applied to a case of recording only or reproduction only. Furthermore, in the above-described embodiments, the wavelength of the servo light and the wavelength of the recording/reproduction beam are described as being different, but aspects of the present invention are not limited thereto and can be applied to a case of extracting servo information and a servo error signal from the recording/reproduction beam.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A holographic data recording and/or reproducing apparatus comprising an optical pickup that emits light to a reflective holographic data storage medium in which a substrate, a reflection layer, a recording layer, and a cover layer are sequentially stacked, wherein the optical pickup comprises:
   a first light source unit to emit, during a recording operation, a signal beam having a first polarization and a reference beam having a second polarization different from the first polarization along a same optical path; and
   a main lens unit to record data by using an interference pattern formed in a direction along a depth of the holographic data storage medium around a focal point on the recording layer, and having a refractivity that varies according to a polarization of a passing light, so as to cause the signal beam to be reflected from the reflection layer then be focused on the focal point and to cause the reference beam to pass through the cover layer of the holographic data storage medium then be directly focused on the focal point,
   wherein the signal beam and the reference beam have a same optical path in the main lens unit.

2. The apparatus as claimed in claim 1, wherein the first polarization is perpendicular to the second polarization.

3. The apparatus as claimed in claim 1, wherein the first light source unit comprises:
   a first light source to emit a light; and
   a polarization conversion device to change the light emitted from the first light source to the signal beam having the first polarization and the reference beam having the second polarization during the recording operation.

4. The apparatus as claimed in claim 3, wherein the light emitted from the first light source is polarized in a same direction as the first polarization.

5. The apparatus as claimed in claim 4, wherein the polarization conversion device transmits the light emitted from the first light source without changing a polarization of the light during a reproduction operation.

6. The apparatus as claimed in claim 3, wherein the polarization change device is an active wave plate.

7. The apparatus as claimed in claim 1, wherein:
   the first light source unit comprises a light exit surface including a first light exit area and a second light exit area; and
   the signal beam is emitted from the first light exit area and the reference beam is emitted from the second exit area during the recording operation.

8. The apparatus as claimed in claim 7, wherein a reproduction beam having the second polarization is emitted from both of the first and the second light exit areas during a reproduction operation.

9. The apparatus as claimed in claim 1, wherein the light source unit comprises:
   a first light source to emit a light having the second polarization; and
   a polarization conversion device having a light exit surface that comprises:
   a polarization conversion area in which the light emitted from the first light source is changed to the signal beam having the first polarization during the recording operation and is transmitted without changing a polarization of the light during a reproduction operation, and
   a non-conversion area in which the light emitted from the first light source is transmitted without changing the polarization of the light during the recording operation and the reproduction operation.

10. The apparatus as claimed in claim 9, wherein one of the polarization conversion area and the non-conversion area is a central area of the light exit surface of the polarization conversion device and another one of the polarization conversion area and the non-conversion area is a peripheral area of the light exit surface encompassing the central area.

11. The apparatus as claimed in claim 1, wherein the first light source unit emits a reproduction beam having the second polarization during a reproduction operation.

12. The apparatus as claimed in claim 11, wherein the optical pickup further comprises:
   a first optical path change device arranged on an optical path of the reproduction beam to split the reproduction beam after being reflected from the holographic data storage medium from the optical path of the reproduction beam emitted from the first light source unit and incident on the holographic data storage medium; and
   a first photodetector to detect the reproduction beam reflected from the holographic data storage medium and split by the first optical path change device.

13. The apparatus as claimed in claim 12, wherein the first optical path change device is a polarized beam splitter that transmits or reflects incident light according to a direction of polarization.

14. The apparatus as claimed in claim 1, wherein the main lens unit comprises:
   a polarization dependent refractive lens having the refractivity that varies according to the polarization of the passing light; and
   an objective lens to focus the signal beam and the reference beam passing through the polarization dependent refractive lens onto the recording layer of the holographic data storage medium.

15. The apparatus as claimed in claim 14, wherein the polarization dependent refractive lens is a liquid crystal lens or a polarization hologram device having the refractivity that varies according to the polarization of the passing light.

16. The apparatus as claimed in claim 1, wherein the data is recorded at the focal point on a bit-by-bit basis.

17. The apparatus as claimed in claim 1, wherein the main lens unit comprises a first relay lens unit that changes the focal point in the direction along the depth of the holographic data storage medium.

18. The apparatus as claimed in claim 1, further comprising a servo optical system to read servo data from the holographic data storage medium.

19. The apparatus as claimed in claim 18, wherein the servo optical system comprises:
   a second light source to emit a servo light having a wavelength different from a wavelength of a light emitted from the first light source unit;
   a second optical path change device to match an optical path of the servo light emitted from the second light source to the optical path of the signal beam and the reference beam;
   a third optical path change device to split the servo light after being reflected from the holographic data storage medium from the optical path of the servo light emitted from the second light source and incident on the holographic data storage medium; and
   a second photodetector to receive the servo light reflected from the holographic data storage medium and split by the third optical path change device.

20. The apparatus as claimed in claim 19, wherein the second optical path change device is a wavelength selective beam splitter that splits a light beam according to a wavelength.

21. The apparatus as claimed in claim 19, wherein the third optical path change device is a polarized beam splitter that transmits or reflects the incident light according to a polarization direction.

22. A method of recording and/or reproducing data to/from a reflective holographic data storage medium in which a substrate, a reflection layer, a recording layer, and a cover layer are sequentially stacked, the method comprising:
   forming a signal beam having a first polarization and a reference beam having a second polarization different from the first polarization along a same optical path;
   causing, by a unit having a refractivity that varies according to a polarization of a passing light, the signal beam to be reflected from the reflection layer then focused on a focal point in the recording layer and the reference beam to pass through the cover layer then be directly focused on the focal point; and
   recording the data using an interference pattern formed around the focal point in a direction along a depth of the holographic data storage medium.

23. The method as claimed in claim 22, wherein the first polarization is perpendicular to the second polarization.

24. The method as claimed in claim 22, wherein the forming of the signal beam and the reference beam comprises:
   emitting a light; and
   changing the emitted light to the signal beam having the first polarization and the reference beam having the second polarization.

25. The method as claimed in claim 24, wherein the changing of the emitting light comprises:
   changing a polarization of a portion of the emitted light according to an area of the emitted light; and
   transmitting another portion of the emitted light without changing a polarization thereof.

26. The method as claimed in claim 24, wherein a polarization of the emitted light is the second polarization.

27. The method as claimed in claim 26, wherein the emitted light is used as a reproduction beam during a reproduction operation.

28. The method as claimed in claim 22, wherein the data is recorded at the focal point on a bit-by-bit basis.

29. The method as claimed in claim 22, wherein the data is recorded in multiple layers in the direction along the depth of the holographic data storage medium by varying the focal point in the depth direction of the holographic data storage medium.

30. The method as claimed in claim 22, further comprising:
   emitting a reproduction beam having the second polarization during a reproduction operation.

31. The method as claimed in claim 30, further comprising:
   splitting the reproduction beam after being reflected from the holographic data storage medium from an optical path of the emitted reproduction beam; and
   detecting, in a photodetector, the split reproduction beam.

32. The method as claimed in claim 22, further comprising:
   reading servo data from the holographic data storage medium.

33. The method as claimed in claim 32, wherein the reading of the servo data comprises:
   emitting a servo light having a wavelength different from a wavelength of the signal beam and a wavelength of the reference beam;
   matching an optical path of the servo light to the optical path of the signal beam and the reference beam;
   splitting the servo light after being reflected from the holographic data storage medium from the optical path of the emitted servo light; and
   receiving, in a photodetector, the servo light reflected from the holographic data storage medium and split by the third optical path change device.

34. An optical pickup that emits light to a reflective data storage medium in which a substrate, a reflection layer, a recording layer, and a cover layer are sequentially stacked in order to record and/or reproduce data to/from the reflective data storage medium, the optical pickup comprising:
   a first light source unit to emit a signal beam and a reference beam along a same optical path; and
   a main lens unit to record the data by using an interference pattern formed in a direction along a depth of the reflective data storage medium around a focal point on the recording layer, and having a refractivity that varies so as to cause the signal beam to be reflected from the reflection layer then be focused on the focal point and to cause the reference beam to pass through the cover layer of the reflective data storage medium then be directly focused on the focal point,
   wherein the signal beam and the reference beam have a same optical path in the main lens unit.

35. The optical pickup as claimed in claim 34, wherein the reflective data storage medium is a reflective holographic data storage medium.

36. The optical pickup as claimed in claim 34, wherein the first light source unit emits the signal beam with a first polarization and the reference beam with a second polarization that is perpendicular to the first polarization.

37. The optical pickup as claimed in claim 34, wherein the first light source unit comprises:
   a first light source to emit a light; and
   a polarization conversion device to change the light emitted from the first light source to the signal beam having a first polarization and the reference beam having a second polarization during a recording operation.

38. The optical pickup as claimed in claim 37, wherein:
   the light emitted from the first light source is polarized in a same direction as the first polarization; and
   the polarization conversion device transmits the light emitted from the first light source without changing a polarization of the light during a reproduction operation.

39. The optical pickup as claimed in claim 34, wherein the first light source unit emits a reproduction beam having a polarization different from a polarization of the signal beam during a reproduction operation.

40. The optical pickup as claimed in claim 39, wherein the optical pickup further comprises:
   a first optical path change device arranged on an optical path of the reproduction beam to split the reproduction beam after being reflected from the holographic data storage medium from the optical path of the reproduction beam emitted from the first light source unit and incident on the reflective data storage medium; and
   a first photodetector to detect the reproduction beam reflected from the reflective data storage medium and split by the first optical path change device.

* * * * *